United States Patent [19]

Svarz

[11] Patent Number: 4,968,448
[45] Date of Patent: Nov. 6, 1990

[54] ANTIFOAM/DEFOAMER COMPOSITION

[75] Inventor: James J. Svarz, Naperville, Ill.

[73] Assignee: Nalco Chemical Company, Naperville, Ill.

[21] Appl. No.: 333,262

[22] Filed: Apr. 5, 1989

Related U.S. Application Data

[63] Continuation of Ser. No. 238,382, Aug. 31, 1988, abandoned.

[51] Int. Cl.$^5$ ............................................. B01D 19/04
[52] U.S. Cl. ..................................... 252/358; 252/321
[58] Field of Search ................................. 252/321, 358

[56] References Cited

U.S. PATENT DOCUMENTS

| 3,881,020 | 4/1975 | Nakamura et al. | 514/619 |
| 3,990,905 | 11/1976 | Wachala et al. | 252/321 |
| 4,427,454 | 1/1984 | Oyama | 252/358 |
| 4,451,390 | 5/1984 | Flannigan | 252/358 |
| 4,745,231 | 5/1988 | Lange et al. | 252/321 |

OTHER PUBLICATIONS

Handbook of Pulp & Paper Technology, Kenneth W. Britt, (Ed) Reinhold Publ. Corp., 1964, p. 334–335.
Pulp & Paper, James P. Casey, Interscience Publ., 1952, pp. 430–431.

Primary Examiner—Mary C. Lee
Assistant Examiner—Catherine Scalzo
Attorney, Agent, or Firm—Ailes, Ohlandt & Greeley

[57] ABSTRACT

An antifoam/defoamer composition comprising a polyether surfactant and a polyhydric alcohol fatty acid ester. The polyether surfactant being admixed with the polyhydric alcohol fatty acid ester in a ratio in the range between 10:90 to 90:10% by weight.

2 Claims, 3 Drawing Sheets

ANTIFOAM/DEFOAMER COMPOSITION

This is a continuation of application Ser. No. 238,382, filed Aug. 31, 1988, now abandoned.

BACKGROUND OF THE INVENTION

A unique antifoam/defoamer composition is provided having concentrated active ingredients, such as a polyether surfactant and a polyhydric alcohol fatty acid ester. This composition is particularly advantageous for foam control and drainage enhancement in the following applications; paper and pulp processes, general wet-end foam control, groundwood/mechanical pulp systems, secondary fiber systems, and bleach plants/screen rooms.

Foam is consistently a problem in the processing of pulp during the manufacture of paper products. Virtually all segments of the papermaking process generate entrained air and surface foam which are extremely undesirable due to their deleterious effect upon process efficiency and the finished product.

A variety of antifoam/defoamer agents have been used with varying degrees of success. Many defoamers are stearic acid or fatty acid based emulsion products. Some examples of stearic acid based emulsion products are set forth in the following patents: U.S. Pat, Nos. 3,705,860 (Duvall), issued Dec. 12, 1972, and 3,337,595.

Typical fatty acid based emulsion products are described in the following Patents: Great Britain Patent Appl. No. 81/29520 (Flannigan), filed Sept. 30, 1981, European Patent Appl. No. EP 76558 (Flannigan), filed Apr. 13, 1983, French Pat. No. 1557086, issued Feb. 14, 1969, German Patent Appl. No. DE 3013292 (Perner et al.), published Oct. 15, 1981, and U.S. Pat. No. 4,451,390 (Flannigan), issued May 29, 1984.

Antifoam products are usually sold in diluted form causing them to be bulky and costly to transport. These defoaming agents may also contain undesirable particulate additives which may deposit throughout the papermaking process resulting in undesirable deposits throughout the system. Particulate additives which may cause deposits and plugging of papermaking systems are typically stearic acids, fatty acids, silicones, hydrophobic silica, waxes or other organic particles.

Other examples of defoamer agents which contain particulate additives, such as silicone, hydrocarbons or other organic particles, are as follows: Great Britain Patent Appl. No. 2,094,330 (Topfl et al.), filed Sept. 15, 1982, German Patent Appl. No. 2,625,707 (Abel et al.). published Dec. 23, 1976, Japanese Patent Appl. No. 50,404/79 (Hirakimoto et al ), published May 14, 1979, and Rumanian Patent Appl. No. 111,852 (Deac et al.). filed Aug. 5, 1983.

The present inventor has developed a unique antifoam/defoamer composition which substantially reduces transportation costs and overcomes deposition problems associated with the aforementioned defoaming agents. It avoids the problems associated with conventional antifoam products by forming a concentrate of active ingredients, such as a polyether surfactant and a polyhydric alcohol fatty acid ester, without any oil, amide, hydrophobic silica or silicone additives.

The use of glycols or glycerols as foam inhibiting agents is described in rhe following patents: Japanese Patent Appl. No. 79/59404 (Hirakimoto et al.), published May 14, 1979, French Pat. No. 2,049,783 (Seizinger), granted Apr. 30, 1971, French Pat. No. 1,557,086, granted Feb. 14, 1969, and Japanese Patent Publication No. 75/005,157, published Feb. 28, 1975.

Hirakimoto et al. describe a defoaming agent which includes a polyether with a molecular weight of 2000-16,00, the polyether being prepared by polymerization of ethylene oxide (5-30 parts) and propylene oxide (95-70 parts) and reaction with a polyol, such as glycerol or sorbitol; 2-ethylhexyl alcohol; and a paraffin oil.

Seizinger describes a nonionic, biodegradable foam inhibitor used in detergents, latexes, and paper manufacturing. The inhibitors are prepared from mixtures of alkylene oxide, glycol, and a polymer catalyst. The catalyst is prepared by heating glycerol in KOH, removing water, and adding propylene oxide under nitrogen. The oxide/glycol/catalyst mixture was thereafter heated, and the catalyst was removed to give a yellow liquid inhibitor.

French Pat. No. 1,557,086 describes an antifoaming agent for use in foam prevention by reaction products with block polyethylene-polypropylene glycols and polyols.

Japanese Patent Publication No. 75/005,157 describes a defoaming agent containing a higher aliphatic ester compound and emulsifier for use in papermaking, fiber, paint, and fermentation industries.

The present invention is a concentrated, active, emulsifiable product which has many cost saving advantages over conventional defoamers. Being a pure active ingredient, the defoamer of the present invention has no base or carrier resulting in reduced transportation and container costs. Furthermore, the fact that this defoamer is not an oil-based defoamer assists in preventing the loss of paper sheet properties, such as brightness, sizing efficiency and strength. Having no oil, amide, hydrophobic silica or silicone additives prevents deposition and felt filling. It has also been discovered that the defoamer composition of the present invention is a much more effective agent for control of entrained air than conventional defoaming agents. Additional advantages of the present invention shall become apparent as described below.

SUMMARY OF THE INVENTION

The present invention provides an antifoam/-defoamer composition comprising a polyether surfactant and a polyhydric alcohol tatty acid ester. The polyether surfactant is mixed with the polyhydric alcohol fatty acid ester in a ratio in the range between about 10:90 to 90:10 percent by weight.

The polyether surfactant contains at least one compound selected from the group consisting of polyoxyalkylated glycerol, polyoxyalkylated sorbitol or sorbitan, polyoxyalkylated sucrose, and isomers thereof. Furthermore, the polyoxyalkylated glycerol, sorbitol or sucrose contain ethylene oxide in the range between about 0-60 weight percent and/or propylene oxide in the range between about 30-100 weight percent, and has a molecular weight in the range between about 1000-10,000. It is preferable that the polyether surfactant have a HLB in the range between about 6-12, preferably 7-10.

More specifically, the polyether surfactant includes a glycerol heteropolymer or block copolymer with ethylene oxide and/or propylene oxide in an amount such that the total molecular weight of the polyether surfactant is about 1000-8000 and such that it contains between about 0-30% ethylene oxide by weight.

The polyhydric alcohol fatty acid ester is typically a polyethylene glycol ester of fatty acids prepared by either oxyalkylation or esterification. Preferably, the polyethylene glycol ester contains from about 1 to about 20 moles of ethylene oxide. The polyethylene glycol ester is a diester of fatty acids. More preferably, the polyethylene glycol ester is a 200–600 mono and/or diesters of oleic, tall oil, or stearic acids. Furthermore, the polyhydric alcohol fatty acid ester contains between about 1–20 moles of ethylene oxide and/or propylene oxide.

The polyethylene glycol ester is obtained by reaction of a fatty acid, such as, oleic, tall oil or stearic acid with polyethylene glycol liquid and solid polymers of the general formula $H(OCH_2CH_2)_nOH$, where n is between about 3 to about 10 or a mixture of the polyethylene glycol esters.

An additional object of the present invention is a method for controlling foam in a papermaking process which includes the step of adding to a pulp slurry, papermaking furnish, and/or pulp suspension an antifoam/defoamer composition comprising a polyether surfactant and a polyhydric alcohol fatty acid ester. The antifoam/defoamer composition is added at a concentration in the range between about 0.01–10.0 lbs./ton of paper produced, preferably in a range between about 0.10–3.0 lbs./ton of paper produced. The present invention may also include many additional features which shall be further described below.

DESCRIPTION OF THE PREFERRED EMBODIMENTS

Figure 1:
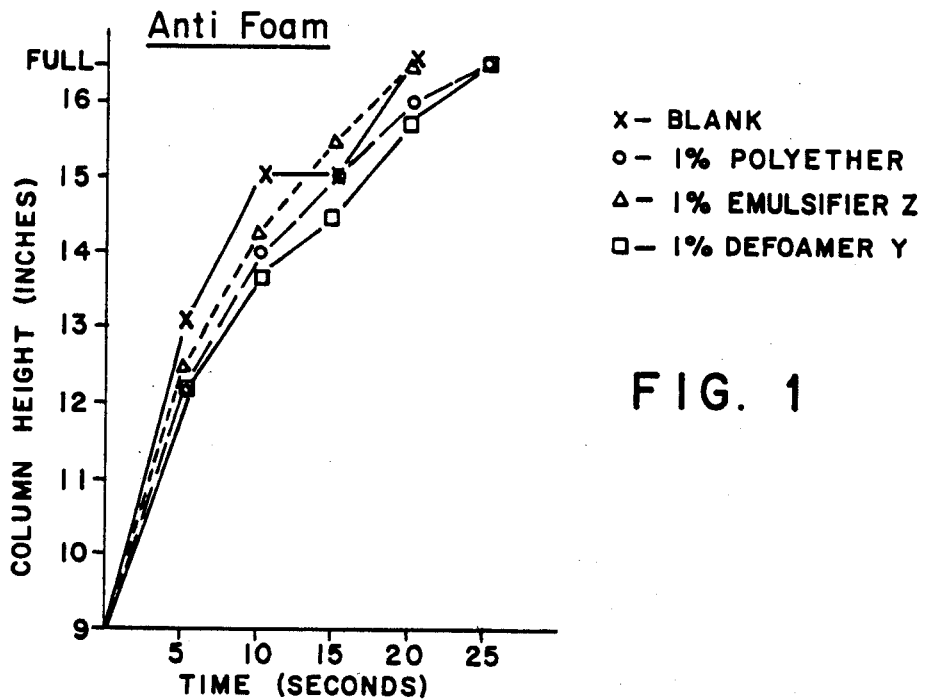
FIG. 1 is a graph which plots foam column height versus time for a polyether surfactant, an emulsifier for the polyether surfactant (emulsifier Z), and the defoamer composition of the present invention (defoamer Y) to determine antifoam characteristics thereof.

The present invention provides an antifoam/defoamer concentrate having superior activity and cost/performance than conventional oil or water based defoamers. It is highly effective in reducing or eliminating entrained air and surface foam in many pulp and paper process streams Furthermore, the defoamer composition of the present invention does not contain oil, amides, hydrophobic silica or silicone additives, thereby avoiding deposition and felt filling problems.

Examples of some applications in which this defoamer composition provides particularly good foam control and drainage enhancement are as follows: general wet-end foam control, groundwood/TMP systems, secondary fiber systems, bleach plants/screen rooms, and effluent streams.

The antifoam/defoamer composition of the present invention comprises a polyether surfactant and a polyhydric alcohol fatty acid ester. The polyether surfactant is mixed with the polyhydric alcohol fatty acid ester in a ratio in the range between about 10:90 to 90:10 percent by weight, preferably 25:75 to 75:25 percent by weight. The polyether surfactant has a HLB in a range between about 6–12, preferably between about 7–10.

The polyether surfactant includes at least on compound selected from the group consisting of polyoxyalkylated glycerol, sorbitol or sorbitan, sucrose, and isomers of these polyhydric alcohols.

The polyhydric alcohol fatty acid ester includes a polyethylene glycol mono and/or diesters of fatty acids prepared by oxyalkylation or esterification of fatty acids. In particular, the ester may be polyethylene glycol 100–800 mono and/or diesters of fatty acids. A preferred ester is polyethylene glycol 200–600 mono and/or diesters of commercial quality oleic, tall oils, or stearic acids. Commercially available polyhydric alcohol fatty acid esters are sold under the trademarks KESSCO (polyethylene glycol ester) by Stepan Chemical Company and EMEREST (polyethylene glycol ester) by Emery Chemical Industries Inc.

Preferably, the polyethylene glycol ester contains from about 1 to about 20 moles of ethylene oxide. The polyethylene glycol ester is obtained by reaction of a fatty acid, such as, oleic, tall oil or stearic acid with polyethylene glycol liquid and solid polymers of the general formula $H(OCH_2CH_2)_nOH$, where n is between about 3 to about 10 or a mixture of the polyethylene glycol esters. The term oleic as used herein shall include oleic, linoleic, linolenic, or combination thereof. The term stearic acid as used herein shall include stearic and/or palmitic acids.

Optionally, the polyhydric alcohol fatty acid ester may have a chemical make-up which includes a fatty acid mono and/or diesters of polyethylene and/or polypropylene glycols reacted with oleic, tall oil or tallow derived fatty acids.

The polyhydric alcohol fatty acid ester may also include fatty acid esters of other polyhydric alcohols, such as, glycerol, sorbitol or sorbitan, sucrose, and isomers of these alcohols. Fatty acids reacted with these alcohols include oleic, tall oil, castor oil and tallow derived fatty acid. These fatty acid esters may be further modified with alkoxylation. Commercially available surfactants are sold under the trademarks SPAN, TWEEN, ARLACEL, ARLATONE, and MYRJ by ICI Americas.

As an example, a preferred antifoam/defoamer composition in accordance with this invention includes a polyoxyalkylated glycerol, sorbitol or sucrose containing about 0–60 weight percent ethylene oxide and/or about 30–100 weight percent propylene oxide, having a molecular weight of between about 1000–10,000. This polyether surfactant is admixed with a polyhydric alcohol fatty acid ester containing 1–20 moles of ethylene oxide and/or propylene oxide or such that a stable emulsion is formed upon dilution with water.

One example of such a polyether surfactant is the reaction product of glycerol with 70 moles of propylene oxide followed by reaction with 16 moles of ethylene oxide yielding a polyether surfactant having a molecular weight to about 4900. Another useful polyether surfactant is obtained by reacting sorbitol with ethylene oxide and propylene oxide. The final product having a molecular weight of about 6700 based on hydroxyl number, a cloud point in distilled water of 64° F. (1.0% soln.), and reduces surface tension of water to 37 dynes cm$^{-1}$ at a concentration of 0.01% by weight.

More specifically, the antifoam/defoamer composition includes a glycerol heteropolymer or block copolymer with ethylene oxide and/or propylene oxide such that the total molecular weight is about 800–8000, and which contains approximately 0–30% ethylene oxide by weight. This polyether surfactant is admixed with a polyhydric alcohol fatty acid ester, such as polyethylene glycol 200–600 mono and/or dioleate.

The preferred concentration of the antifoam/defoamer composition useful in controlling entrained air and surface foam of a papermaking process is from about 0.010–10.0 lbs./ton of paper produced. Even more preferably in the range between about 0.10–3.0 lbs./ton of paper produced.

EXAMPLE 1

A laboratory evaluation of three defoamers was conducted using an antifoam recirculation tester. The samples tested were as follows:
1. a 1% solution of a polyether surfactant.
2. a 1% solution of a polyethylene glycol ester (emulsifier Z).
3. a 1% solution of a blend of polyethylene glycol ester and polyether surfactant (defoamer y).

Figure 2:
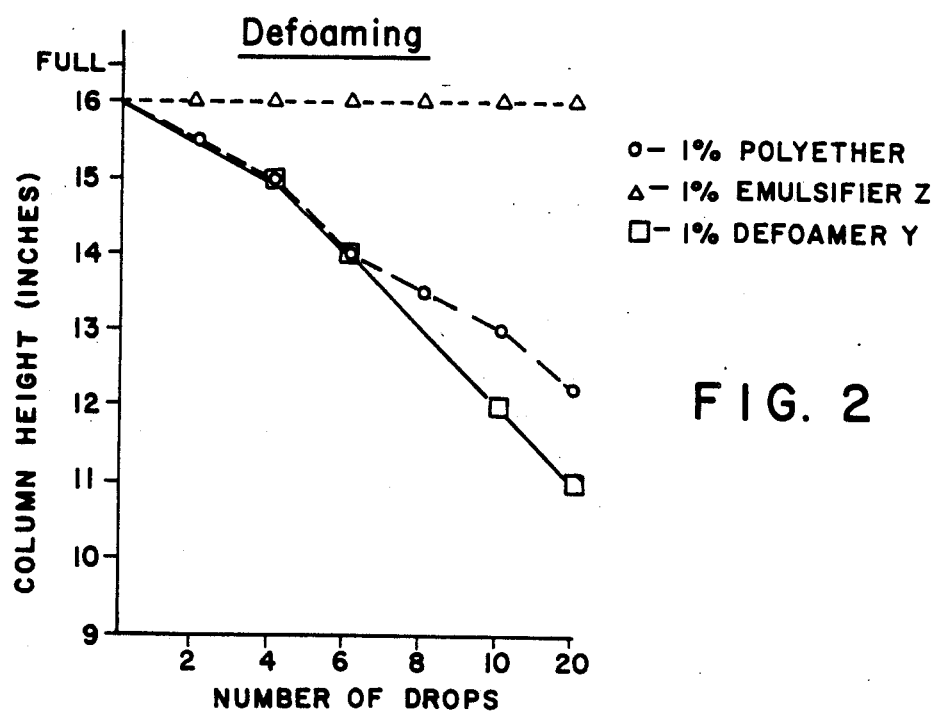
FIG. 2 is a graph which plots foam column height versus the number of drop of a polyether surfactant, emulsifier Z, and the defoamer composition of the present invention (defoamer Y) to determine defoaming characteristics thereof.

The antifoam and defoaming characteristics of these samples are set forth in FIG. 1 and FIG. 2, respectively. The data in FIGS. 1 and 2 clearly indicates that the defoamer of the present invention (defoamer Y), i.e., a blend of a polyether surfactant and a polyhydric alcohol fatty acid ester, works effectively as an antifoam/defoamer agent.

EXAMPLE 2

Figure 3:
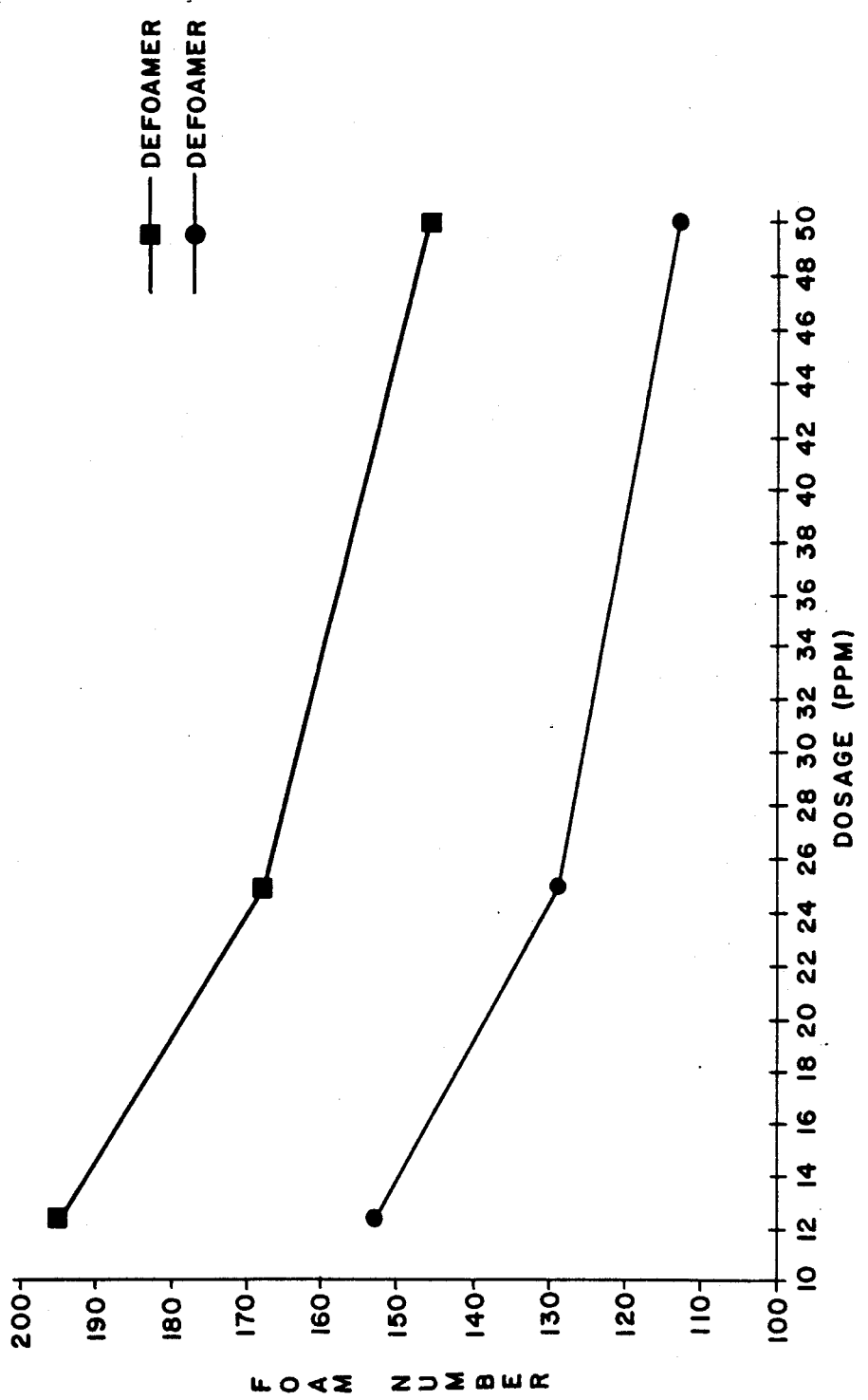
FIG. 3 is a graph which plots foam number versus dosage (ppm) for a 100% active propoxylated fatty alcohol defoamer (defoamer R) and the defoamer composition of the present invention (defoamer Y)

The defoamer of the present invention (defoamer Y), i.e., a blnd of a polyether surfactant and a polyhydric alcohol fatty acid ester, was tested against a 100% active propoxylated fatty alcohol defoamer (defoamer R). The concentration of each sample was gradually increased from 0–50 ppm in a groundwood thick stock at 135° Fahrenheit. The results set forth in FIG. 3, clearly demonstrate that rhe defoamer composition of the present invention (defoamer Y) generated a much lower foam number than defoamer R and, as such, a much greater product performance

EXAMPLE 3

A laboratory evaluation of four defoamers was conducted using an antifoam recirculation tester. Various defoamers were added to groundwood papermaking furnish at a dosage of 2 ppm and the foam height was recorded over time. The four samples were:
1. a blend of a polyhydric alcohol fatty acid ester and a polyether surfactant (defoamer Y).
2. a polyether surfactant.
3. a polyethylene glycol ester (defoamer X).
4. a water-based emulsion defoamer (defoamer S).

Figure 4:
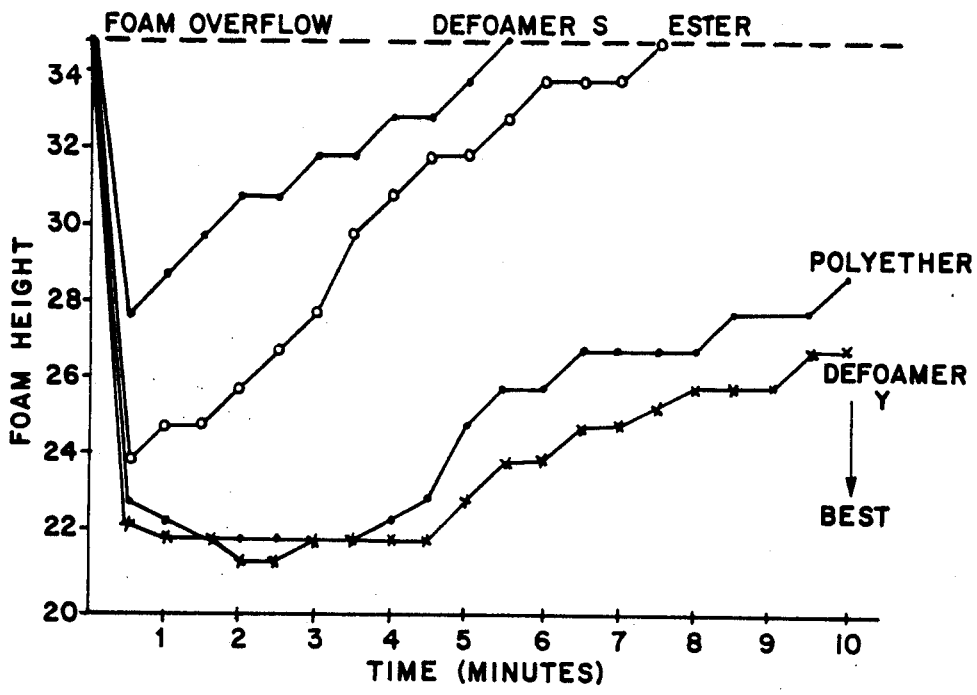
FIG. 4 is a graph which plots foam height versus time for a water-based emulsion defoamer (defoamer S), a polyether surfactant, a polyethylene glycol ester, and the defoamer composition of the present invention (defoamer Y)

The results of the recirculation tester are set forth in FIG. 4, attached hereto. FIG. 4 clearly demonstrates the appreciable reduction in foam height during the processing of groundwood papermaking furnish with the defoamer of the present invention (defoamer Y).

Similar results occurred when the defoamer dosages were increased to 5 ppm and 10 ppm, although at lower dosages, such as 2 ppm, the defoamer of the present invention was far superior to the others tested.

EXAMPLE 4

An entrained air tester was used to determine rhe effectiveness of the antifoam/defoamer composition of the resent invention versus various other defoamers. The following samples were run:
1. a defoamer concentrate of the polyhydric alcohol fatty acid ester type (defoamer A).
2. an oil-based particulate containing defoamer (defoamer B).
3. a blend of a polyhydric alcohol fatty acid ester and a polyether surfactant (defoamer Y).
4. a polyether surfactant.
5. a defoamer containing hydrophobic silica and ethylene bis stearamide (defoamer C).
6. a defoamer containing fatty alcohol as the active ingredient (defoamer D).

Figure 5:
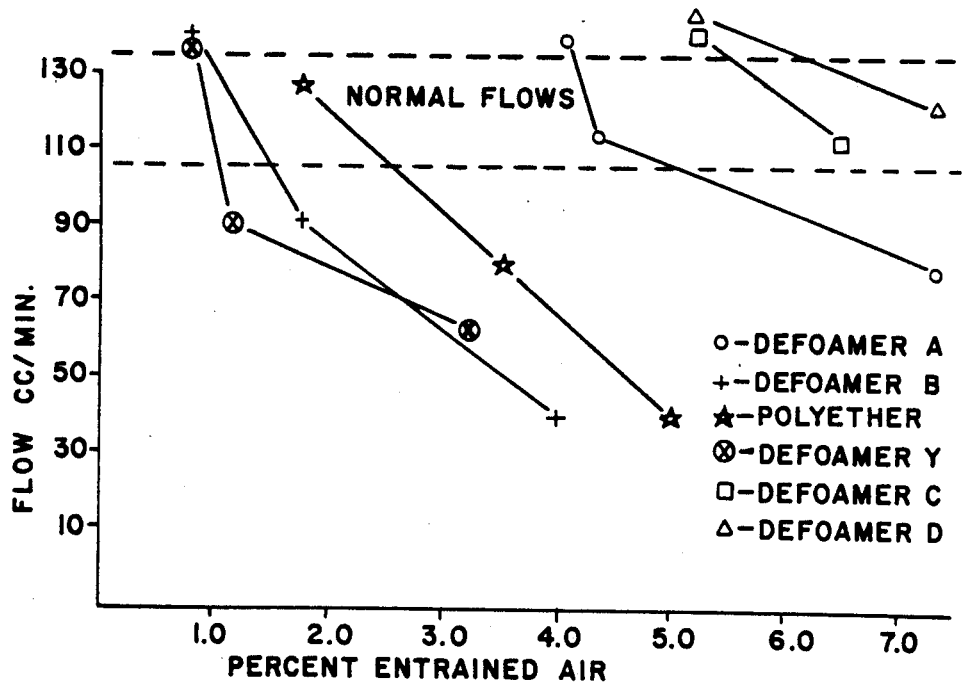
FIG. 5 is a graph which plots defoamer flow versus entrained air levels for a defoamer A, an oil-based particulate containing concentrated defoamer B, a polyether surfactant, a water-based silica/amide defoamer C, a fatty alcohol water-based particulate defoamer D, and the defoamer composition of the present invention (defoamer Y).

The results are set forth in FIG. 5, attached hereto, wherein the defoamer of the present invention (defoamer Y) demonstrated good surface foam and entrained air control. Defoamer A demonstrated good surface foam control, but poor entrained air control. The polyether surfactant, defoamer C, and defoamer D all demonstrated poor surface foam and entrained air control. Defoamer B also demonstrated good surface foam and entrained air control.

EXAMPLE 5

A laboratory evaluation of seven (7) defoaming agents was conducted using an antifoam recirculation tester. The samples tested were:
1. a polyether surfactant Sample 1).
2. a polyhydric alcohol fatty acid ester, such as polyethylene glycol diester, (Sample 2).
3. a polyether surfactant and a polyhydric alcohol fatty acid ester (Sample 3).
4. a fatty alcohol-based defoamer (Sample 4).
5. an oil-based polyethylene glycol ester (Sample 5).
6. a polyethylene glycol ester defoamer (Sample 6).
7. a 100% active propoxylated fatty alcohol defoamer (Sample 7).

This evaluation was conducted on an antifoam recirculation rester with the results thereof being set forth below in Table 1.

TABLE 1

| Time | Blank | 1 | 2 | 3 | 4 | 5 | 6 | 7 |
|---|---|---|---|---|---|---|---|---|
| 0 | 20 | 20 | 20 | 20 | 20 | 20 | 20 | 20 |
| 15 | 24 | 20 | 20 | 20 | 20 | 20 | 20 | 20 |
| 30 | 27 | 20 | 20 | 20 | 20 | 20 | 20 | 20 |
| 45 | 30 | 20 | 20 | 20 | 23 | 21 | 20 | 20 |
| 60 | 33 | 20 | 20 | 20 | 25 | 22 | 22 | 22 |
| 75 | 33 | 22 | 20 | 20 | 26 | 22 | 22 | 24 |
| 90 | 33 | 24 | 22 | 20 | 27 | 24 | 24 | 25 |
| 105 | 34 | 25 | 25 | 20 | 28 | 27 | 26 | 25 |
| 120 | 35 | 27 | 26 | 22 | 29 | 29 | 28 | 26 |

The numbers 20–35 are units of measure on the recirculation tester itself. The higher the number the more foam generated. Thus, in accordance with this analysis the antifoam/defoamer of the present invention (Sample 3) was the most effective defoamer over time.

While I have shown and described several embodiments in accordance with my invention it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. An antifoam/defoamer composition comprising:
   10–90% by weight of a polyether surfactant, said polyether surfactant is a reaction product of glycerol with propylene oxide followed by reaction with ethylene oxide; and
   10–90 % by weight of a polyhydric alcohol fatty acid ester, said polyhydric alcohol fatty acid ester comprising: a fatty acid mono and/or diester of polyethylene glycol and/or polypropylene glycol.

2. The antifoam/defoamer composition according to claim 1, wherein said propylene oxide is present in an amount of about 70 moles and ethylene oxide is present in an amount of about 16 moles, whereby a polyether surfactant having a molecular weight of about 4900 is formed.

* * * * *